US012760861B2

(12) United States Patent
Kossoff et al.

(10) Patent No.: US 12,760,861 B2
(45) Date of Patent: Oct. 13, 2026

(54) VEHICLE LIGHT WITH HEATING ELEMENT

(71) Applicant: Wheel Pros, LLC, Greenwood Village, CO (US)

(72) Inventors: Matt Kossoff, Atlanta, GA (US); Yoshitaka Ishida, Lancaster, CA (US); Chen Yu, Hong Kong (HK)

(73) Assignee: Wheel Pros, LLC, Greenwood Village, CO (US)

( * ) Notice: Subject to any disclaimer, the term of this patent is extended or adjusted under 35 U.S.C. 154(b) by 0 days.

(21) Appl. No.: 18/940,157

(22) Filed: Nov. 7, 2024

(65) Prior Publication Data

US 2025/0146644 A1 May 8, 2025

Related U.S. Application Data

(60) Provisional application No. 63/547,799, filed on Nov. 8, 2023.

(51) Int. Cl.
*F21S 45/60* (2018.01)

(52) U.S. Cl.
CPC .................................... *F21S 45/60* (2018.01)

(58) Field of Classification Search
CPC ........................................................ F21S 45/60
See application file for complete search history.

(56) References Cited

FOREIGN PATENT DOCUMENTS

WO WO-2023198372 A1 * 10/2023 ............. F21S 45/20

* cited by examiner

*Primary Examiner* — Sean P Gramling
(74) *Attorney, Agent, or Firm* — Womble Bond Dickinson (US) LLP

(57) ABSTRACT

A vehicle light has a heating element and a radiator vent that creates and distributes heated air inside the vehicle light. This prevents fog buildup on the inside of the light in cold and wet weather, allowing for more efficient and therefore safer lights for vehicles. A series of ceramic heating elements is arrayed in front of individual spines of a radiator vent. As each ceramic heating element receives electricity from the vehicle, its surface heats up. Air is blown past the heating elements and directed through the radiator vent by two or more blower motors. A temperature sensor regulates the amount of electricity that is sent to each ceramic element.

21 Claims, 6 Drawing Sheets

VEHICLE LIGHT WITH HEATING ELEMENT

CROSS REFERENCE TO RELATED APPLICATIONS

This utility patent application claims priority back to U.S. Provisional No. 63/547,799, filed Nov. 8, 2023, the contents of which are incorporated by reference into this application.

FIELD OF THE INVENTION

This disclosure is directed generally to Vehicle Lights, and more specifically to a vehicle light with a heating element which prevents fog or ice build-up on the front lens cover.

SUMMARY OF THE INVENTION

A vehicle light has a heating element and a radiator vent that creates and distributes heated air inside the vehicle light. This prevents fog building up on the inside of the light and frost from building up on the outside of the light in cold and wet weather, allowing for more efficient and therefore safer lights for vehicles. A series of ceramic heating elements are arrayed in front of individual spines of a radiator vent. As each ceramic heating element receives electricity from the vehicle, its surface heats up. Air is blown past the heating elements and directed through the radiator vent by two or more blower motors. A temperature sensor regulates the amount of electricity that is sent to each ceramic element.

BACKGROUND OF THE INVENTION

A common problem with vehicle lights is that when the surrounding air is cold and/or humid, the interior of the light can fog up and frost can build up on the outside of the light. This creates a less than ideally efficient focusing of the vehicle light beam. As such, it is obviously desirable to have a vehicle light that does not fog up or frost up.

There have been various attempts to make vehicle lights with ventilation openings and internal heaters, but ventilation openings are fairly useless when the humid air they allow in is just as humid as the air they are letting out, or when the freezing air they let in is just as cold as the surrounding air. Internal heaters are useful, but there needs to be a means of directing the heated air toward the inside front surface of the light.

This invention solves this need by providing a vehicle light that has built into it a heating element and a radiator vent, where the heated air is directed toward the front of the light by the radiator vents. When a temperature sensor detects low temperatures, it triggers a relay to send electrical energy to a series of ceramic heating elements that are arrayed in front of individual spines of the radiator vent. As the ceramic heating elements heat up, one or more blower motors turn on and direct a stream of air past the heating elements. This stream of air is directed by the radiator vent directly toward the inside of the front surface of the vehicle light, thereby heating it up and defrosting the outer surface of the light, or preventing frost from building up in the first place.

OBJECTS OF THE INVENTION

A first object of the invention is to provide a vehicle light that does not fog up or frost up when being driven through cold environments.

A second object of the invention is to provide a temperature sensor that triggers the heating of one or more ceramic heating elements, where one or more blower motors blow air past the heating elements, and where a radiator vent then directs the heated air onto the inside of the front of the vehicle light, thereby keeping the front of the vehicle light free from condensation and moisture, and the buildup of frost on the outer surface of the light.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE DRAWINGS

Figure 1:
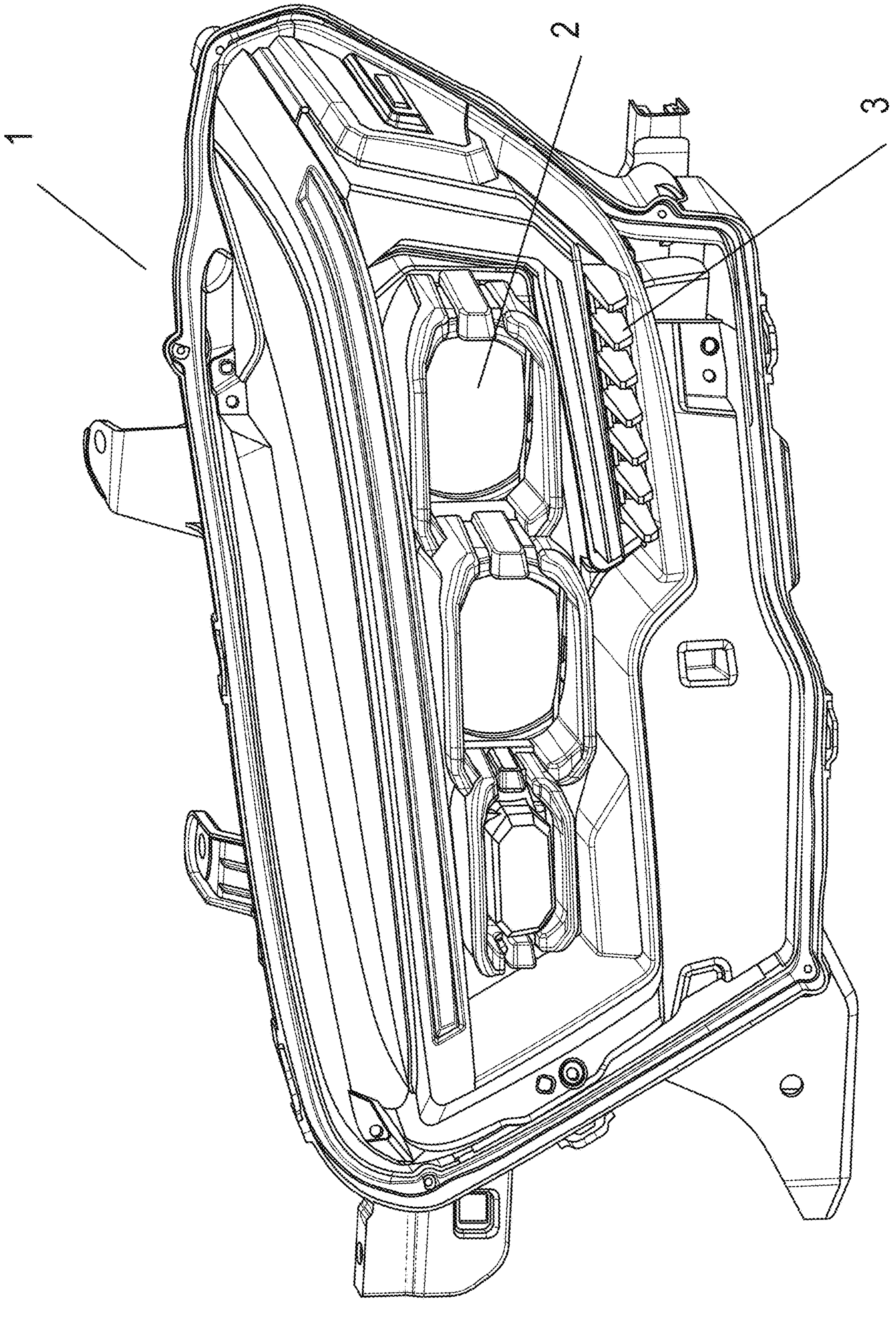
FIG. 1 is a perspective view of a vehicle light with an internal heating element and radiator vent to distribute heated air onto the inside of the front surface of the vehicle light.

FIG. 1 is a perspective view of a vehicle light with an internal heating element and radiator vent to distribute heated air onto the inside of the front surface of the vehicle light. The light has a mounting frame 1, which attaches to the vehicle, and a clear glass front portion. Inside the clear front portion are light elements 2. Under the light elements 2 is a radiator vent 3.

Figure 2:
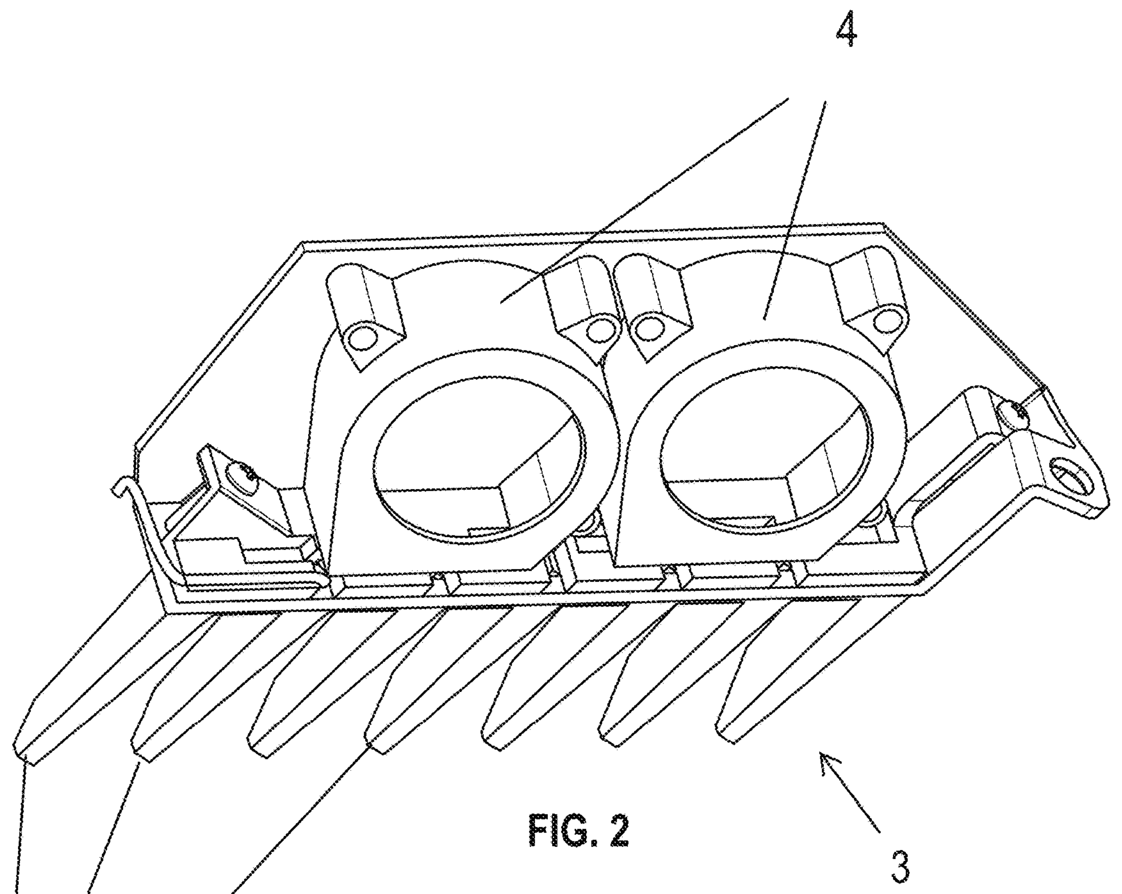
FIG. 2 is a bottom, perspective view of the blower motor, ceramic heating elements and radiator vent.

FIG. 2 is a bottom, perspective view of the blower motor, ceramic heating elements and radiator vent. One or more blower motors 4, takes electricity from the vehicle and delivers a supply of air past the heating elements 5, which radiate heat into the air supply. The newly heated air is then expelled through the radiator vent 3, which directs the heated air onto the inside of the front lens or face of the light. This heated air de-fogs or defrosts both the inside and outside of the light, where condensation often builds up when outside temperatures are low and/or weather conditions are humid.

Figure 3:
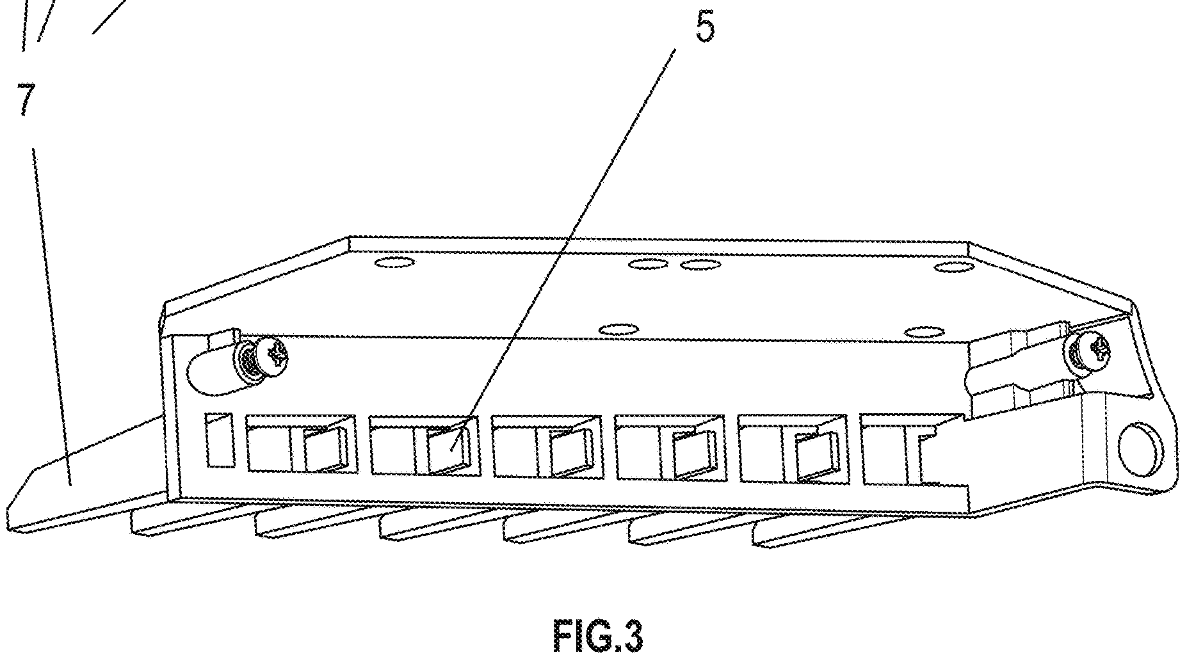
FIG. 3 is a back, perspective view of the ceramic heating elements and radiator vent.

FIG. 3 is a back perspective view of the ceramic heating elements 5 and radiator vent 3. The air from the blower motors (4 in FIG. 2) is channeled past the heating elements 5 by the spines 7 of the radiator vent 3.

Figure 4:
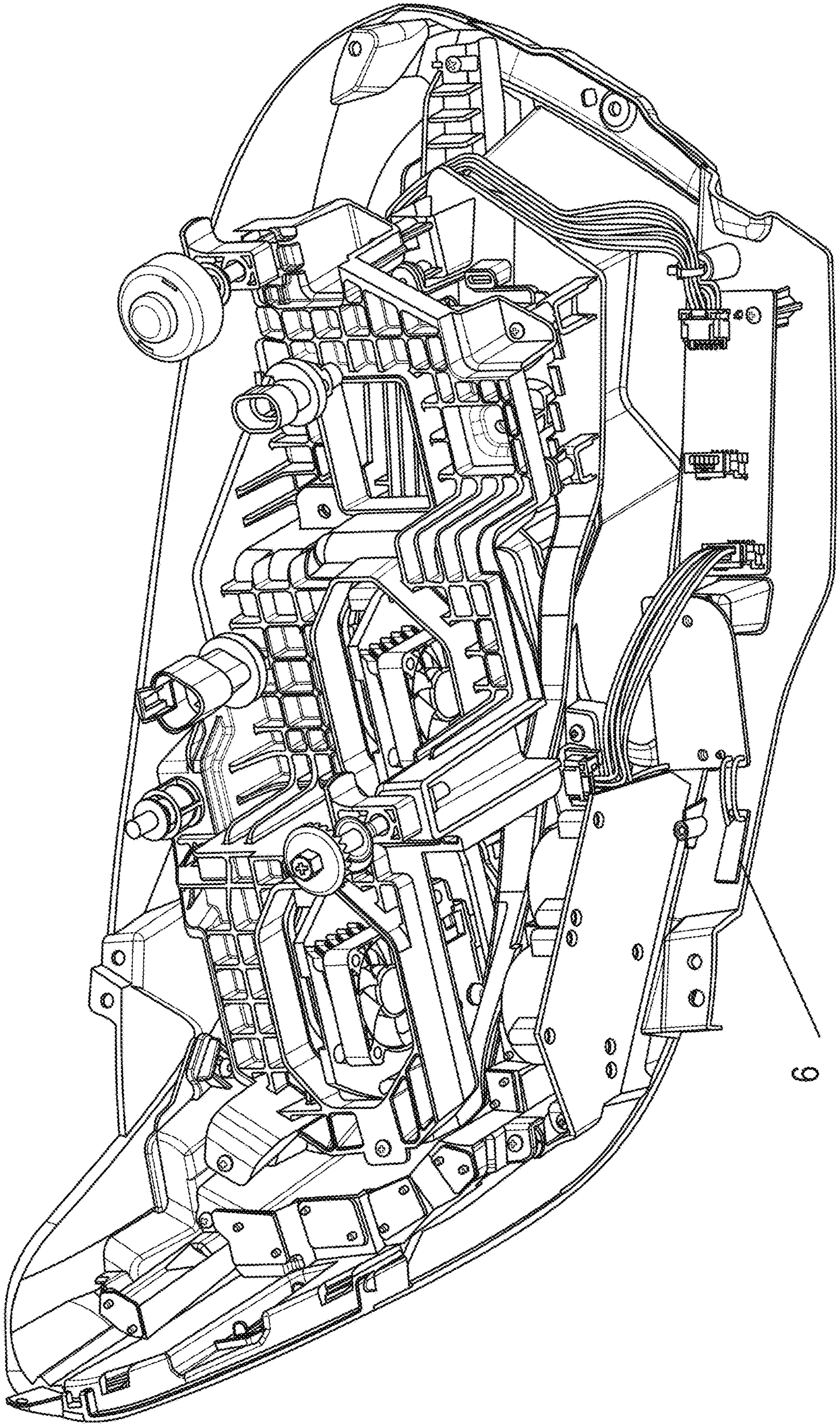
FIG. 4 is a cut-away perspective view of the interior of the light, showing the location of a temperature sensor.

FIG. 4 is a cut-away perspective view of the interior of the light, showing the location of a temperature sensor 6. The temperature sensor detects when the outside temperature drops below a certain point at which condensation often forms on the inside of the light. Once such a temperature is detected, the temperature sensor triggers electricity to be sent to the blower motors (4 in FIG. 2) and the ceramic heating elements (5 in FIGS. 2 and 3).

Figure 5:
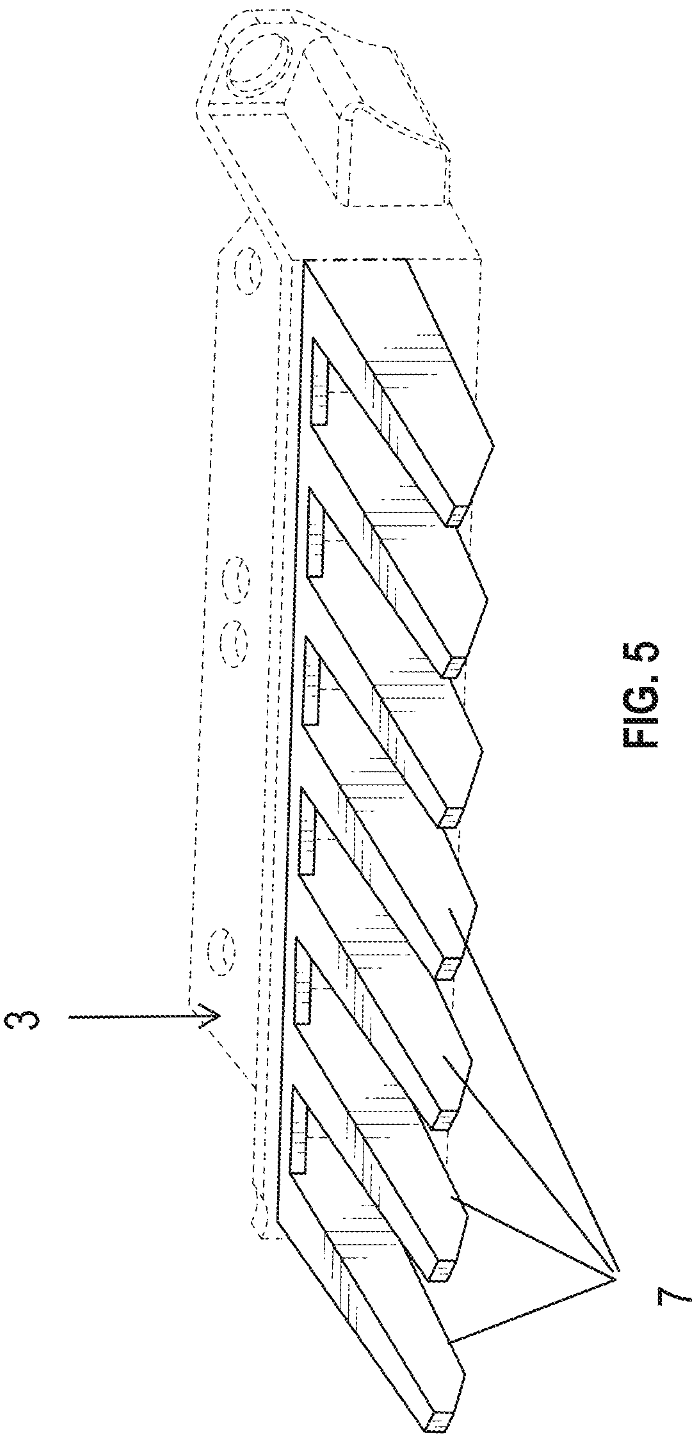
FIG. 5 is a front, perspective view of the heater element and the spines by which the heat is directed toward the front of the interior of the light.

FIG. 5 is a front, perspective view of the heater element 3 and the spines 7 by which the heat is directed toward the front of the interior of the light.

Figure 6:
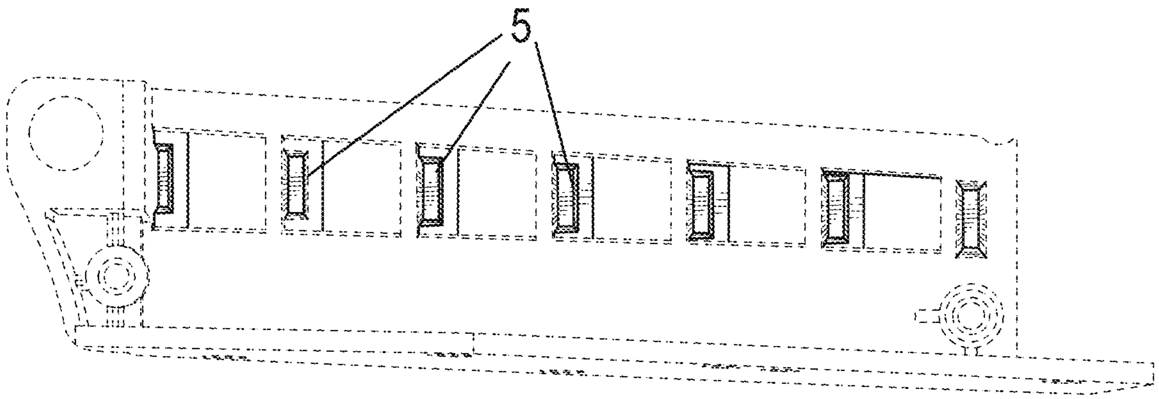
FIG. 6 is a back, perspective view of the heater element showing the location of the ceramic heating elements.

FIG. 6 is a back, perspective view of the heater element showing the location of the ceramic heating elements 5.

Figure 7:
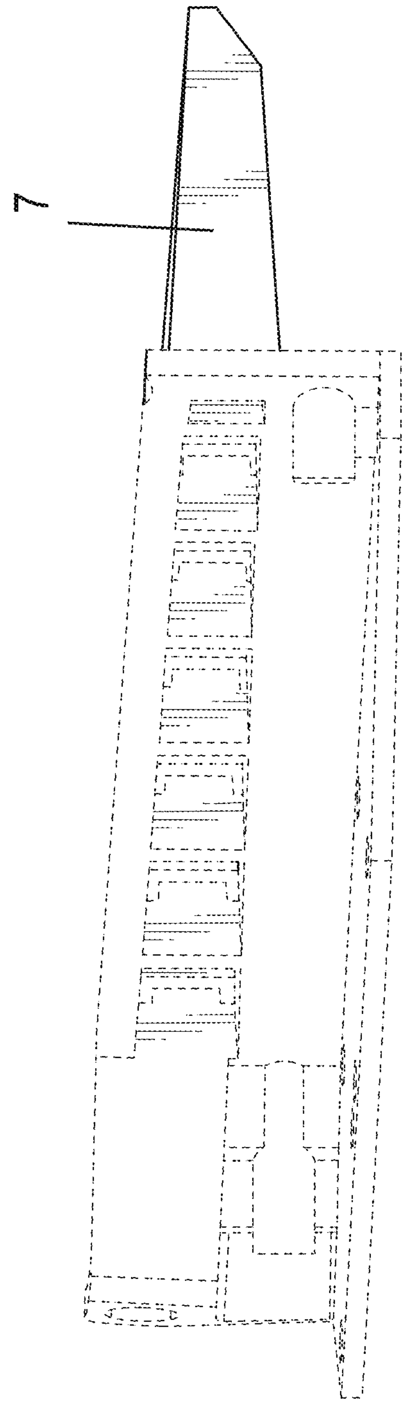
FIG. 7 is a side view of the heating element showing the spines.

FIG. 7 is a side view of the heating element showing the spines 7.

In a preferred embodiment, the inventors have found that an optimum method of preventing fogging and frosting of the vehicle light is created by connecting a front and a back portion, with a temperature sensor, one or more blower motors, one or more heating elements, and a radiator vent. With this combination of elements, when the temperature sensor senses an internal temperature within the vehicle light, and when the temperature senor detects the internal temperature below a set point, it directs an amount of electricity to the one or more blower motors and the one or more heating elements. This causes the one or more blower motors to turn on and direct a quantity of unheated air to the one or more heating elements, where the one or more heating elements heat up and provide a quantity of heat to the quantity of unheated air, where the quantify of unheated air becomes a quantity of heated air, where the quantity of heated air is directed to an interior surface of the front by a radiator vent.

In another preferred embodiment, the one or more heating elements are acrylic heating elements or ceramic heating elements, with two blower motors. In this embodiment, each radiator vent comprises at least two spines-optimally at least six spines, where each of the one or more heating elements is located in front of the at least two spines. As the quantity of heated air is directed toward an inside surface of a front surface of the vehicle light is prevents fogging and defrosts the light.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to “embodiment(s)”, “disclosure”, “present disclosure”, “embodiment(s) of the disclosure”, “disclosed embodiment(s)”, and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms “means for” or “step for” are recited in the respective claim.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What we claim is:

1. A vehicle light comprising:

a headlamp front lens;

a headlight housing connected to the headlamp front lens to define an interior section therebetween;

a radiator defining a passage between the interior section of the vehicle light and an outside of the vehicle light;

a temperature sensor attached to the headlight housing outside of the interior section, the temperature sensor configured to measure an ambient air temperature of air surrounding the vehicle light;

a first heating element positioned within the radiator, the first heating element having an on state in which the first heating element is resistively heated by electrical energy delivered thereto and an off state, the first heating element configured to switch to the on state when the temperature sensor measures the ambient air temperature below a threshold temperature; and a first blower motor attached to the headlight housing and positioned to blow air through the passage of the radiator and into the interior section of the vehicle light when in an on mode thereof, the first blower motor configured to switch to the on mode when the temperature sensor measures the ambient air temperature below the threshold temperature;

wherein the first blower motor in the on mode thereof is configured to blow air across the first heating element in the on state thereof to increase a temperature of the blown air to a temperature greater than the ambient air temperature to heat the headlamp front lens.

2. The vehicle light according to claim 1, wherein the first heating element is a ceramic heating element.

3. The vehicle light according to claim 1, wherein the first heating element is an acrylic heating element.

4. The vehicle light according to claim 1, further comprising a second blower motor.

5. The vehicle light according to claim 1, wherein the radiator comprises a first spine and a second spine, each of the first spine and the second spine extending from a front side of the radiator into the interior section towards the headlamp front lens of the vehicle light, the first spine and the second spine spaced apart by the passage.

6. The vehicle light according to claim 5, wherein the first spine and the second spine taper distally as the first spine and the second spine extend into the interior section.

7. The vehicle light according to claim 5, further comprising a second heating element, the first heating element disposed within the first spine and the second heating element disposed within the second spine.

8. The vehicle light according to claim 7, wherein the radiator comprises a total of at least six spines including the first spine and the second spine.

9. The vehicle light according to claim 1, further comprising light elements disposed within the interior section of the vehicle light, the light elements configured to emit light.

10. The vehicle light according to claim 1, further comprising a mounting frame configured to mount the vehicle light to a vehicle.

11. A vehicle light comprising:

a front side and a back side opposite the back side, the front side and the back side defining an interior section therebetween;

a radiator defining a plurality of passages between the interior section of the vehicle light and an outside of the vehicle light;

a temperature sensor attached to the back side of the vehicle light outside of the interior section, the temperature sensor configured to measure an ambient air temperature of air surrounding the vehicle light;

a plurality of heating elements positioned within the radiator and extending into the interior section of the vehicle light, the plurality of heating elements having an on state in which each heating element is resistively heated by electrical energy delivered thereto and an off state, the plurality of heating elements configured to switch to the on state in when the temperature sensor measures the ambient air temperature below a threshold temperature; and a blower motor attached to the back side and positioned to blow air through the plurality of passages of the radiator and into the interior section of the vehicle light when in an on mode thereof, the blower motor configured to switch to the on mode when the temperature sensor measures the ambient air temperature below a threshold temperature;

wherein the blower motor in the on mode thereof is configured to blow air across the plurality of heating elements to increase a temperature of the blown air to a temperature greater than the ambient air temperature to heat the interior section of the vehicle light.

12. The vehicle light according to claim 11, wherein the plurality of heating elements are acrylic heating elements.

13. The vehicle light according to claim 11, wherein the plurality of heating elements are ceramic heating elements.

14. The vehicle light according to claim 11, wherein the radiator comprises a plurality of spines extending into the interior section of the vehicle light.

15. The vehicle light according to claim 14, wherein each spine has a respective heating element of the plurality of heating elements disposed therein.

16. The vehicle light according to claim 15, wherein the plurality of spines includes between two spines to six spines.

17. The vehicle light according to claim 14, wherein adjacent spines of the plurality of spines are spaced apart by a respective passage of the plurality of passages.

18. The vehicle light according to claim 11, wherein the radiator is configured to direct air blown by the blower motor toward an interior surface of the front side of the vehicle light.

19. A vehicle light comprising:

a headlamp front lens;

a headlight housing connected to the headlamp front lens to define an interior section therebetween;

a radiator defining a passage between the interior section of the vehicle light and an outside of the vehicle light, the radiator including a first spine and a second spine each extending into the interior section along a spine axis towards the headlamp front lens of the vehicle light along a, the first spine and the second spine spaced apart by the passage;

a temperature sensor attached to the headlight housing outside of the interior section, the temperature sensor configured to measure an ambient air temperature of air surrounding the vehicle light, a first heating element disposed within the first, the first heating element having an on state in which the first heating element heats the first spine and an off state, the first heating element configured to switch to the on state when the temperature sensor measures the ambient air temperature below a first threshold temperature;

a second heating element disposed within the second spine, the second heating element having an on state in which the second heating element heats the second spine and an off state, the second heating element configured to switch to the on state when the temperature sensor measures the ambient air temperature below the first threshold temperature; and a blower motor attached to the headlight housing and positioned to blow air through the passage of the radiator and into the interior section of the vehicle light when in an on mode thereof, the blower motor configured to switch to the on mode when the temperature sensor measures the ambient air temperature below a second threshold temperature, the blower motor blowing the air through the passage in a direction parallel to the spine axis of the first spine and the second spine;

wherein the blower motor in the on mode thereof is configured to blow air across the first spine and the second spine with the first heating element and the second heating element in the on state thereof to increase a temperature of the blown air to a temperature greater than the ambient air temperature to heat the headlamp front lens.

20. The vehicle light according to claim 19, wherein the first spine and the second spine taper distally along the spine axis as the first spine and the second spine extend into the interior section.

21. The vehicle light according to claim 19, wherein the first threshold temperature and the second threshold temperature are the same.

* * * * *